US010664595B2

(12) United States Patent
Borlick et al.

(10) Patent No.: US 10,664,595 B2
(45) Date of Patent: May 26, 2020

(54) MANAGING READS AND WRITES TO DATA ENTITIES EXPERIENCING A SECURITY BREACH FROM A SUSPICIOUS PROCESS (71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Gregory E. McBride, Vail, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 390 days.

(21) Appl. No.: 15/479,218

(22) Filed: Apr. 4, 2017

(65) Prior Publication Data
US 2018/0285566 A1 Oct. 4, 2018

(51) Int. Cl.
G06F 21/00 (2013.01)
G06F 21/56 (2013.01)
G06F 21/62 (2013.01)
G06F 21/55 (2013.01)
G06F 21/50 (2013.01)

(52) U.S. Cl.
CPC ............ G06F 21/566 (2013.01); G06F 21/50 (2013.01); G06F 21/55 (2013.01); G06F 21/554 (2013.01); G06F 21/568 (2013.01); G06F 21/6218 (2013.01); G06F 2221/034 (2013.01); G06F 2221/2151 (2013.01)

(58) Field of Classification Search
CPC ........ G06F 21/50; G06F 21/55; G06F 21/552; G06F 21/554; G06F 21/56; G06F 21/561; G06F 21/562; G06F 21/563; G06F 21/566; G06F 21/568
See application file for complete search history.

(56) References Cited

U.S. PATENT DOCUMENTS

| 5,551,043 A | 8/1996 | Crump et al. |
| 8,495,037 B1* | 7/2013 | Westenberg ........ G06F 11/1448 707/698 |
| 8,789,181 B2 | 7/2014 | Blackwell |

(Continued)

OTHER PUBLICATIONS

A. Kamra et al., "Responding to anomalous database requests." Workshop on Secure Data Management. Springer Berlin Heidelberg, 2008, pp. 17.

(Continued)

Primary Examiner — Edward Zee
(74) Attorney, Agent, or Firm — David W. Victor; Konrad Raynes Davda & Victor LLP (57) ABSTRACT Provided are a computer program product, system, and method for managing reads and writes to data entities experiencing a security breach from a suspicious process. A suspicious process is detected that is determined to have malicious code. A breach time for a data entity is indicated in response to detecting the suspicious process performing an operation with respect to the data entity. A determination is made whether there is a copy of the data entity created after the breach time for the data entity. A copy of the data entity is created when there is no copy of the data entity created after the breach time.

19 Claims, 6 Drawing Sheets (56) References Cited

U.S. PATENT DOCUMENTS

2007/0136541 A1* 6/2007 Herz ................. G06F 11/1466
711/162
2014/0325616 A1* 10/2014 Dolph .................... G06F 21/64
726/5

OTHER PUBLICATIONS

M. Schmidt et al. "Trustbox: A security architecture for preventing data breaches." 2011 19th International Euromicro Conference on Parallel, Distributed and Network-Based Processing. IEEE, 2011, pp. 5.

M. Tu et al., "Data Loss Prevention and Control: Inside Activity Incident Monitoring, Identification, and Tracking in Healthcare Enterprise Environments." The Journal of Digital Forensics, Security and Law: JDFSL 10.1 (2015): 27, pp. 18.

"Antivirus software", Wikipedia, [online][retrieved Mar. 26, 2017] https://en.wikipedia.org/wiki/Antivirus_software, pp. 10.

* cited by examiner

FIG. 1

Data Entity Security Information

FIG. 2

Copy Information

MANAGING READS AND WRITES TO DATA ENTITIES EXPERIENCING A SECURITY BREACH FROM A SUSPICIOUS PROCESS

BACKGROUND OF THE INVENTION

1. Field of the Invention

The present invention relates to a computer program product, system, and method for managing reads and writes to data entities experiencing a security breach from a suspicious process.

2. Description of the Related Art

Anti-malware software, also known as anti-virus software, is used to detect, prevent and remove malicious software, such as malicious browser helper objects (BHOs), browser hijackers, ransomware, key loggers, backdoors, rootkits, Trojan horses, worms, malicious LSPs, dialers, fraud tools, adware and spyware. Typically when there is a possible data breach from malicious software, access to the data subject to the breach is blocked until the security threat is resolved, so as to avoid any alteration of data by the suspicious software.

There is a need in the art for improved techniques for responding to security threats from detected suspicious processes potentially having malware.

SUMMARY

Provided are a computer program product, system, and method for managing reads and writes to data entities experiencing a security breach from a suspicious process. A suspicious process is detected that is determined to have malicious code. A breach time for a data entity is indicated in response to detecting the suspicious process performing an operation with respect to the data entity. A determination is made whether there is a copy of the data entity created after the breach time for the data entity. A copy of the data entity is created when there is no copy of the data entity created after the breach time.

With the described embodiments, a copy of a data entity subject to access by a suspicious process suspected to be malicious is created after a breach time at which the suspicious process is detected in order to allow writes to the data to proceed in the event the detected suspicious process is determined not to be malware. However, the created copy may be used to restore the data written to the pre-breach state in the event the suspicious process is confirmed to be malware. This reduces write latency for non-malevolent processes deemed suspicious by allowing writes from the suspicious process to proceed, but allow the writes to be reversed from the copy in the event the suspicious process does in fact comprise malicious code.

In a further embodiment, indication is made that the data entity is subject to a security breach in response detecting the suspicious process performing the operation with respect to the data entity. A determination is made as to whether a write request from the suspicious process is directed to a target data entity indicated as having a security breach including the data entity. A determination is made as to whether a copy of the target data entity was created after the breach time in response to determining that the write request is directed to the target data entity having the security breach, wherein the copy of the target data entity is created in response to determining that there is no copy of the target data entity created after the breach time for the data entity when receiving the write request to the data entity.

With the above embodiment, a security breach may be indicated on a data entity basis to allow restriction only to the particular data entities that are accessed by the suspicious process. Further, the copy of the target data entity is created upon indicating the breach if there is no such copy. However, if there is already a copy of the target data entity created after the breach, then a new copy does not have to be created. In this way, a copy to preserve pre-breach data is created only if there is no copy available for such purpose.

In a further embodiment, indication is made of a security breach for each of a plurality of data entities and a breach time for the data entity when detecting a suspicious process performing an operation with respect to the data entity. For each of the data entities, a copy of the data entity is created when there is no copy of the data entity when a write request is received from the suspicious process to the data entity.

With the above embodiment, security breaches are indicated for each of the data entities being accessed by the suspicious process and a copy is created when a write request is received from the suspicious process to the data entity. In this way, restrictions and copy operations are only performed for those data entities experiencing a security breach, and other data entities are not affected, so as to only introduce monitoring and copying with respect to those data entities affected by the suspicious process.

In a further embodiment, a determination is made as to whether a read request for requested data is directed to a target data entity indicated as having a security breach. A determination is made as to whether the requested data in the target data entity has a timestamp earlier than the breach time. The read request is allowed to proceed in response to determining that the timestamp of the requested data is earlier than the breach time. The read request is blocked in response to determining that the timestamp of the requested data is later than the breach time.

With the above embodiment, read requests are allowed to proceed if the requested data has not been updated since the detected breach time by the suspicious process. In this way, read latency is minimized by allowing all reads to proceed unless the reads are to data that was updated by a suspicious process potentially having malicious code. However, no latency occurs if the data has not been modified by the suspicious process. In this way, latency and delays are limited to only that data that was updated by the potentially malicious code.

In a further embodiment, a determination is made as to whether the requested data is indicated as sensitive data. If not sensitive, then the read request is allowed to proceed. in response to determining that the requested data is not indicated as sensitive. If sensitive, then the read request is blocked.

With the above embodiment, there is a possibility that the suspicious process does not in fact have malicious code. Thus, to avoid delays and latency for a suspicious process that may not in fact be malicious, access is permitted to data that is not sensitive so the suspicious process may continue processing. However, if the requested data is sensitive, such as confidential or private, then access is blocked because given the nature of the data, the risk of harm if the suspicious process is in fact malicious likely exceeds any potential benefits of allowing a suspicious process later confirmed as non-malevolent to proceed.

DETAILED DESCRIPTION

Anti-malware software identifies security threats and potential malicious processes, and then may block access to data subject to the security threat until the security threat is resolved. However, in many cases, a process identified as malicious may in fact turn out to be a valid process. In such case, actions that cordon off data sets while a security threat is being identified and ascertained may prevent legitimate processes wrongly categorized as a suspicious process from accessing valid data. Further, much of the data legitimate processes seek to access may not have been affected or altered by the malevolent process. Yet further blocking a suspicious process from reading and writing may cause unnecessarily processing delays in the event the suspicious process is in fact not malevolent, and perhaps even a critical process. Denying legitimate and critical processes accesses to data that is not in fact affected by an actual or false security threat unnecessarily interferes with system operations and performance.

Described embodiments address the above problems by providing a threat manager that allows processes to continue reading and writing to data entities even if a security threat has been detected with respect to a data entity. Described embodiments limit a suspicious process potentially having malware from accessing sensitive data and allows a suspicious process to continue writing data by making a copy of data entities subject to writes by the suspicious process. In this way, if the suspicious process is later confirmed to be malevolent, than any data written to by the suspicious process may be restored from the copy to a pre-breach state. Yet further, read access to legitimate processes are allowed to continue to a data entity subject to writes from a suspicious process by limiting reads to data that has not been updated following a detected security threat.

Figure 1:
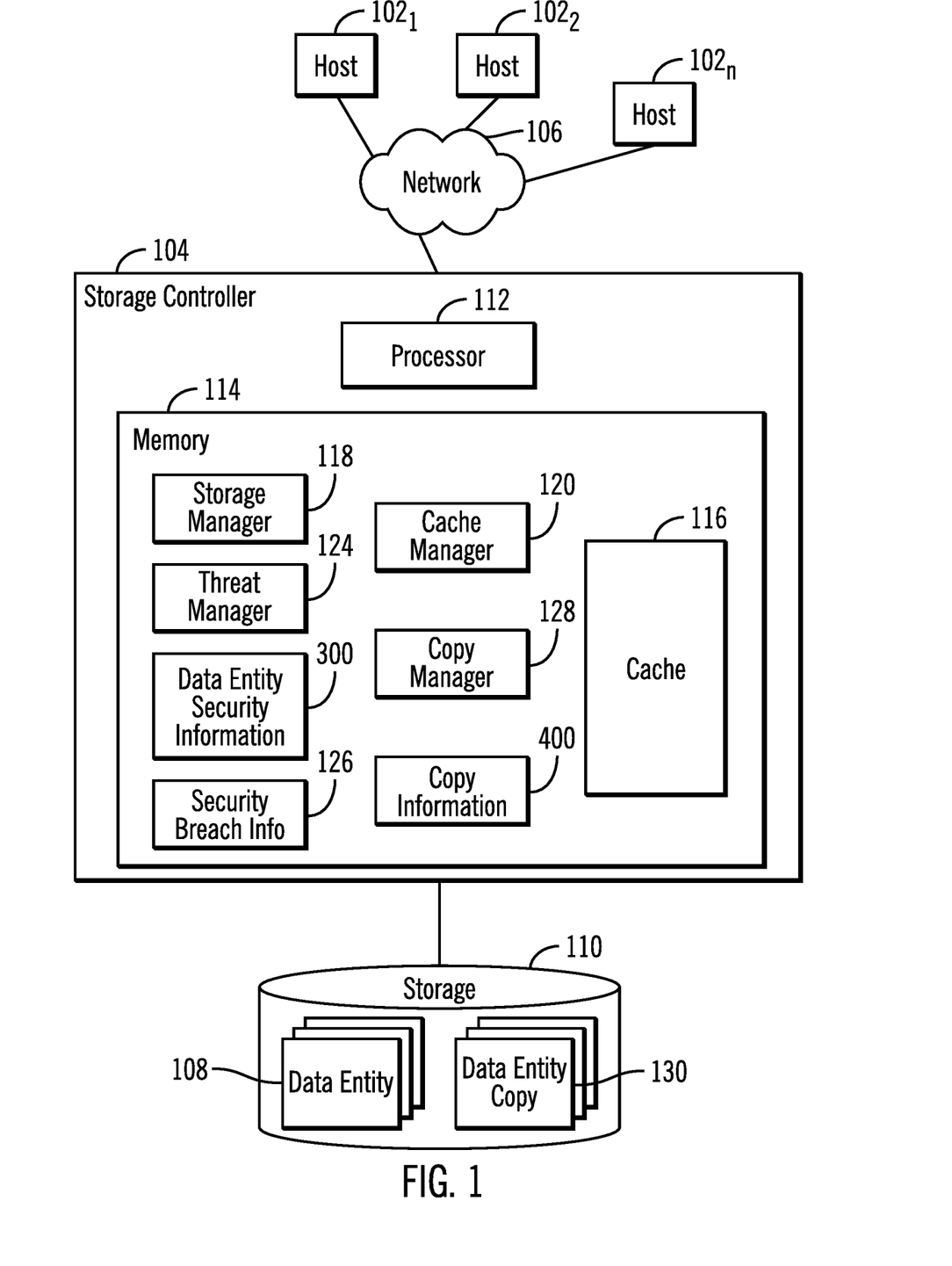
FIG. 1 illustrates an embodiment of a computing environment.

FIG. 1 illustrates an embodiment of a computing environment. A plurality of hosts $102_1$, $102_2$ ... $102_n$ may submit Input/Output (I/O) requests to a storage controller 104 over a network 106 to access data entities 108 (e.g., Volumes, Logical Unit Numbers, Logical Devices, Logical Subsystems, data sets, extents of data, data objects, databases, etc.) in a storage 110. The storage controller 104 includes one or more processors 112 and a memory 114, including a cache 116 to cache data for the storage 110. The processor 112 may comprise a separate central processing unit (CPU), one or a group of multiple cores on a single CPU, or a group of processing resources on one or more CPUs. The cache 116 buffers data transferred between the hosts $102_1$, $102_2$ ... $102_n$ and data entities 108 in the storage 110.

The memory 114 includes a storage manager 118 for managing the transfer of tracks transferred between the hosts $102_1$, $102_2$ ... $102_n$ and the storage 110 and a cache manager 120 that manages data transferred between the hosts $102_1$, $102_2$ ... $102_n$ and the storage 110 in the cache 116. A track may comprise any unit of data configured in the storage 110, such as a track, Logical Block Address (LBA), storage cell, group of cells (e.g., column, row or array of cells), sector, segment, etc., which may be part of a larger grouping of tracks, such as a volume, logical device, etc.

The memory 114 further includes a threat manager 124 to manage threats detected at data entities 108 in the storage 110. The threat manager 124 maintains data entity security information 300 providing threat status of the data entities 108 and suspicious processes information 126 indicating processes executing in the hosts $102_1$, $102_2$ ... $102_n$ and/or storage controller 104 that are determined to potentially comprise malicious code, such as virus, malware, ransomware, etc. The threat manager 124 may use suitable anti-malware techniques known in the art to detect suspicious software that may potentially comprise malware. The memory 114 further includes a copy manager 128 to create copies 130, such as point-in-time copies, of the data entities 108 in the storage 110. The copy manager 128 may generate copy information 400 having information on the data entity copies 130.

In embodiments, where the copies 130 comprises point-in-time copies, such as Snapshot, FlashCopy®, etc., the creation of a copy is instantaneous and allows hosts $102_1$, $102_2$ ... $102_n$ to continue accessing the source data, e.g., data entity 108, of a copy 130 while actual mirroring to the copy 130 are deferred to a later time. The point-in-time copy establishment appears instantaneous because the copy manager 128 returns I/O complete in response to generating the relationship 300i data structures without copying the data. (FlashCopy is a registered trademark of International Business Machines Corporation throughout the world).

The storage manager 118, cache manager 120, copy manager 128, and threat manager 124 are shown in FIG. 1 as program code loaded into the memory 114 and executed by one or more of the processors 112. Alternatively, some or all of the functions may be implemented as microcode or firmware in hardware devices in the storage controller 104, such as in Application Specific Integrated Circuits (ASICs).

The storage 110 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts $102_1$, $102_2$ ... $102_n$ may connect to the storage controller 104 over a bus interface, such as a Peripheral Component Interconnect (PCI) bus interface and other interfaces known in the art.

Figure 2:
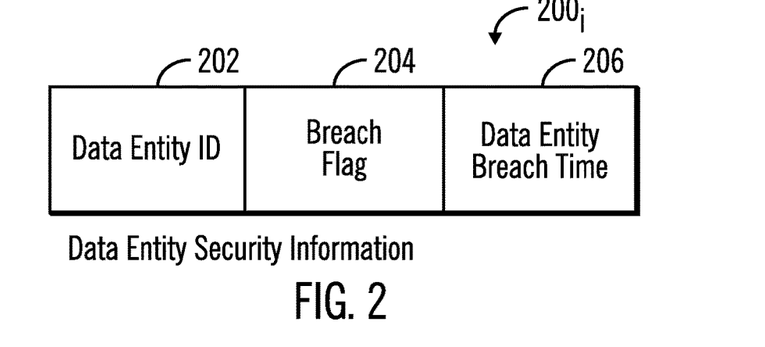
FIG. 2 illustrates an embodiment of data entity security information for a data entity.

FIG. 2 illustrates an embodiment of an instance of data entity security information $300_i$ for one of the data entities $108_i$ in the storage 110, including a data entity identifier (ID) 202, e.g., a volume name, etc.; a breach flag 204 indicated whether a potential security breach has been detected with respect to the data entity 202; and a breach time 206 indicating a time the security breach was detected with respect to the data entity 202.

Figure 3:
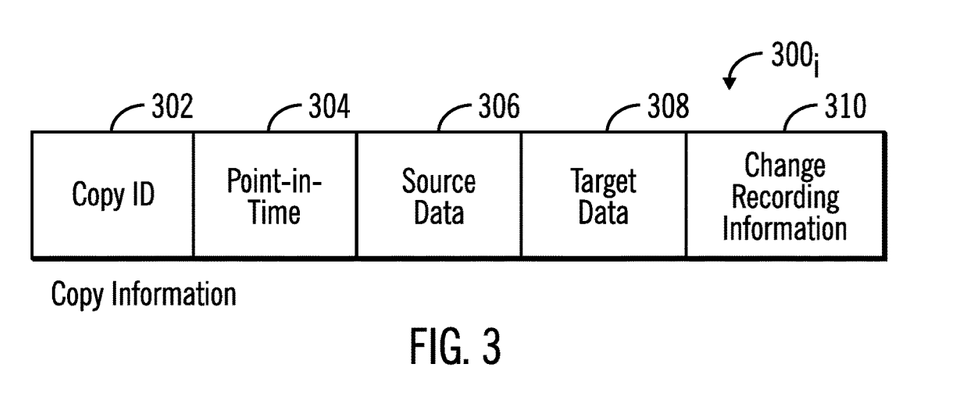
FIG. 3 illustrates an embodiment of copy information for a point-in-time copy.

FIG. 3 illustrates an instance of a copy relationship $300_j$, which may include a point-in-time ("PiT") copy identifier 302 identifying the PiT copy; a point-in-time 304 of the PiT copy 302, such that data is consistent as of that point-in-time 304; source data 306, such as a data entity 108; target data 308, a data entity copy 130, to which the PiT data from the source data entity 108 is copied; and change recording information 310, such as a change recording bitmap, indicating source 306 data that has been updated or changed following the point-in-time 304 of the point-in-time copy $300_j$, which needs to be copied over to the target data 308.

In one embodiment the data entity copy 130 comprises a point-in-time copy that includes only changed data from the data entity 108, that is copied over as part of a copy-on-write. In alternative embodiments, the data entity copy 130 may comprise a copy type other than a PiT copy.

Figure 4:
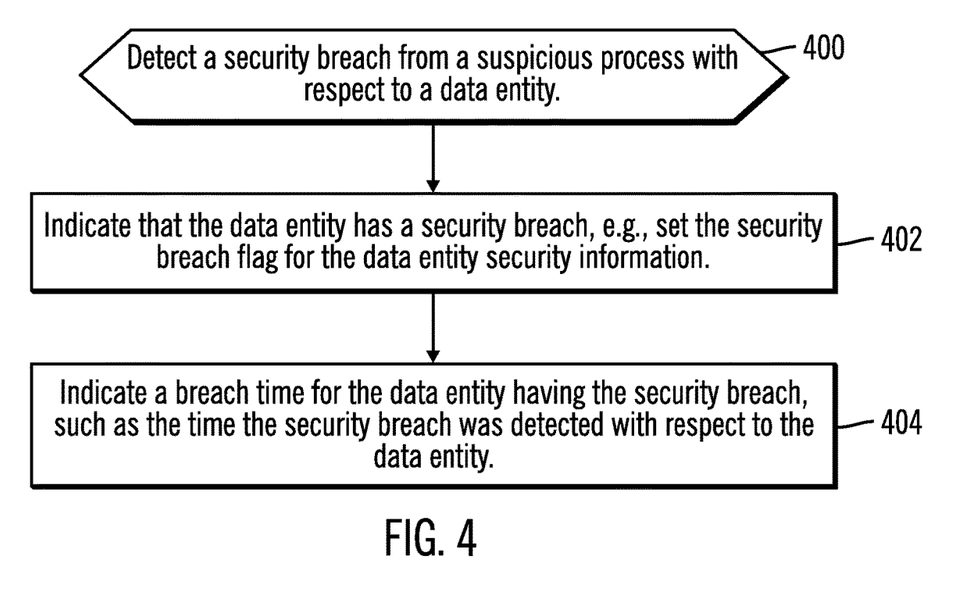
FIG. 4 illustrates an embodiment of operations upon detecting a security breach from a suspicious process.

FIG. 4 illustrates an embodiment of operations performed by the threat manager 124 upon detecting a security threat of a suspicious process comprising potentially malicious code that is writing to a data entity $108_i$, such as a volume or logical drive. Upon detecting (at block 400) a security breach, the threat manager 124 indicates (at block 402) that the data entity $108_i$ has a security breach, such as by setting the breach flag 206 in the data entity security information $200_i$ for the data entity $108_i$ to indicate the data entity $108_i$ has been accessed by a suspicious process. A breach time 208 is indicated (at block 404), which may comprise a time or timestamp the security breach, e.g., access by the suspicious process, was detected.

Figure 5:
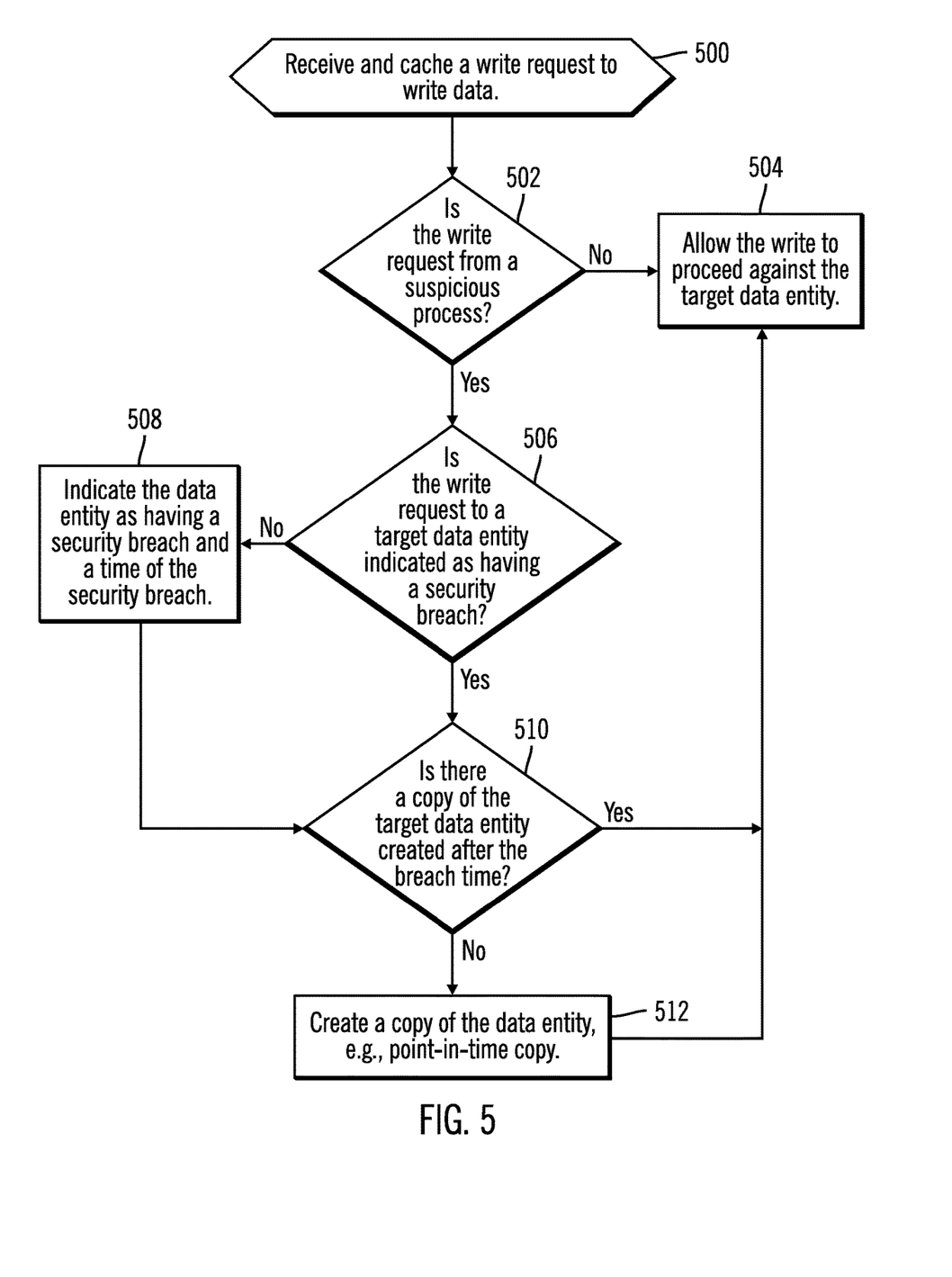
FIG. 5 illustrates an embodiment of operations to process a write request when there are potential security threats.

FIG. 5 illustrates an embodiment of operations performed at the storage controller 104, such as by the storage manager 118, cache manager 120, copy manager 128, and threat manager 124, to process a write request from a host system $102_1, 102_2 \ldots 102_n$ to write data to a data entity $108_i$ in the storage 110. Upon the storage manager 118 receiving (at block 500) a write request and the cache manager 120 caching the write request in the cache 116, the threat manager 124 determines (at block 502) whether the write request is from a suspicious process executing in one of the host systems $102_1, 102_2 \ldots 102_n$, where suspicious processes information 126 identifies those suspicious processes to the threat manager 124. If (at block 502) the write request is not from a suspicious process, then the write is allowed to continue (at block 504), by allowing the write data in the cache 116 to be destaged to the data entity 108 in the storage 110 to which it is directed. If (at block 502) the write request is from a suspicious process, then a determination is made (at block 506) whether the target data entity $108_i$ of the write request has a security breach, such as indicated by breach flag 204 in the security information $200_i$ for the data entity $108_i$. If not, then the threat manager 124 indicates (at block 508) that the data entity 108 has a security breach by indicating the security breach in the breach flag 204 of the security information $200_i$ for the data entity 108 and set a time of the security breach by adding a time of the detected breach with respect to the data entity to the breach time 206 for the security information $200_i$ for the data entity 108.

After indicating (at block 508) that the data entity 108 has a security breach or if the target data entity is indicated as having a security breach, such as in breach flag 204, then a determination is made (at block 510) whether there is a copy $300_i$ of the target data entity 108 that was created after the breach time 206 for the data entity, i.e., having a point-in-time 304 less than the breach time 206. If (at block 510) there is no copy, then a copy of the data entity $130_i$ is created (at block 512), such as by calling the copy manager 128 to create a copy and copy information $300_i$ for a copy of the source data entity $108_i$ to a copy of the data entity $130_i$. If (at block 510) there already is a copy of the data entity $130_i$ or after the copy $130_i$ is created (at block 512), then the write is allowed to proceed (at block 504), such as allowed to be destaged from cache.

With the described embodiment of FIG. 5, a write from a suspicious process is allowed to proceed with respect to the data entity, e.g., volume, if a point-in-time copy (or other copy) has been made of the data entity subject to the suspicious process write. If there is no such copy, then one may be created to allow writes from a suspicious process to proceed. The suspicious process is allowed to proceed because there is a possibility the deemed suspicious process is not malicious. In such case, it is preferable for all the write data from the later cleared suspicious process to be applied to the data entity 108 in the storage 110. Further, if the suspicious process is later confirmed as malicious, then any malicious writes may be overwritten by the pre-written data maintained in the data entity copy 130.

Figure 6:
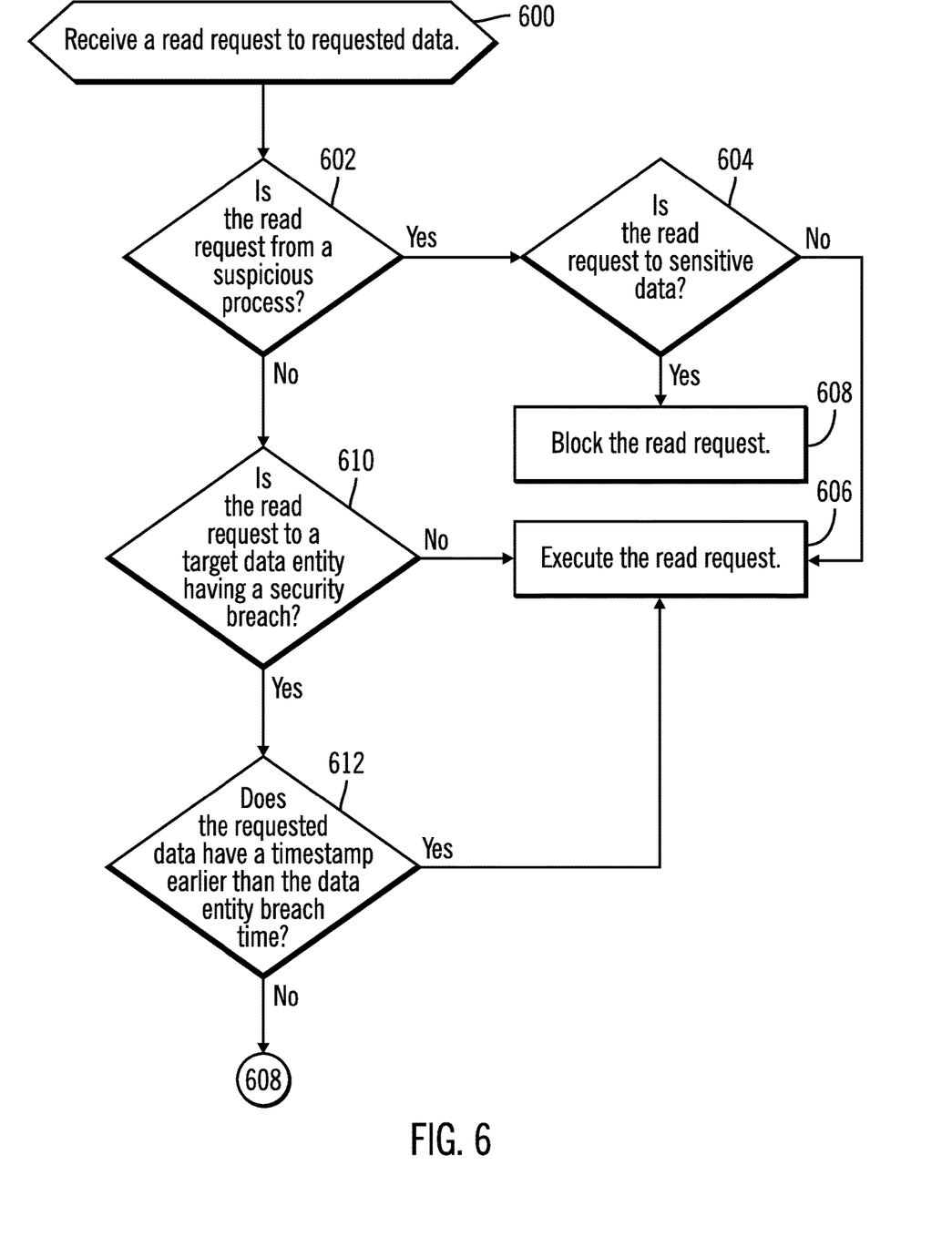
FIG. 6 illustrates an embodiment of operations to process a read request when there are potential security threats.

FIG. 6 illustrates an embodiment of operations performed at the storage controller 104, such as by the storage manager 118, cache manager 120, copy manager 128, and threat manager 124, to process a read request from a host system $102_1, 102_2 \ldots 102_n$, to read requested data from a data entity $108_i$ in the storage 110. Upon the storage manager 118 receiving (at block 600) a read request for requested data, the threat manager 124 determines (at block 602) whether the read request is from a suspicious process. If so, then if (at block 604) the read request is for sensitive data, such as data having personal or confidential information, then the read request is blocked 608, such as with a message to retry after the detected security breach is resolved. If (at block 604) the read request is not to sensitive data, then the read request is executed (at block 606) to return the requested data from the data entity 108, which may be in the cache 116 or storage 110.

If (at block 602) the read request is not from a suspicious process and if (at block 610) the target data entity $108_i$ to which the read is directed does not have a security breach, such as indicated in breach flag 204 for the data entity security information $200_i$, then the read request is allowed to execute (at block 606). If (at block 610) the target data entity $108_i$ has had a security breach, then the threat manager 124 determines (at block 612) whether the requested data to read in the data entity $108_i$ has a timestamp (of the time the requested data was last updated or created) that is earlier in time than the data entity breach time 206. If so, then the read request is allowed to execute (at block 606). Otherwise, if the requested data of the read has been updated since the data entity breach time 206, then the read request is blocked (at block 608) because the requested data may have malicious data written by the suspicious process.

With the described embodiment of FIG. 6, a suspicious process read request is allowed to read non-sensitive data because there is a chance the suspicious process is valid and not malicious. This allows suspicious processes that are not malevolent to continue uninterrupted when only non-sensitive data is needed. However, the risk of misuse of sensitive data outweighs the processing needs of the suspicious process to warrant not returning sensitive data. Further, a read request from a process that is not suspicious, or not suspected of being malicious, is allowed to proceed if the requested data was not updated by a suspicious process, which is ensured by not returning requested data when the data entity $108_i$ was updated after the security breach to the data entity $108_i$ was detected.

Figure 7:
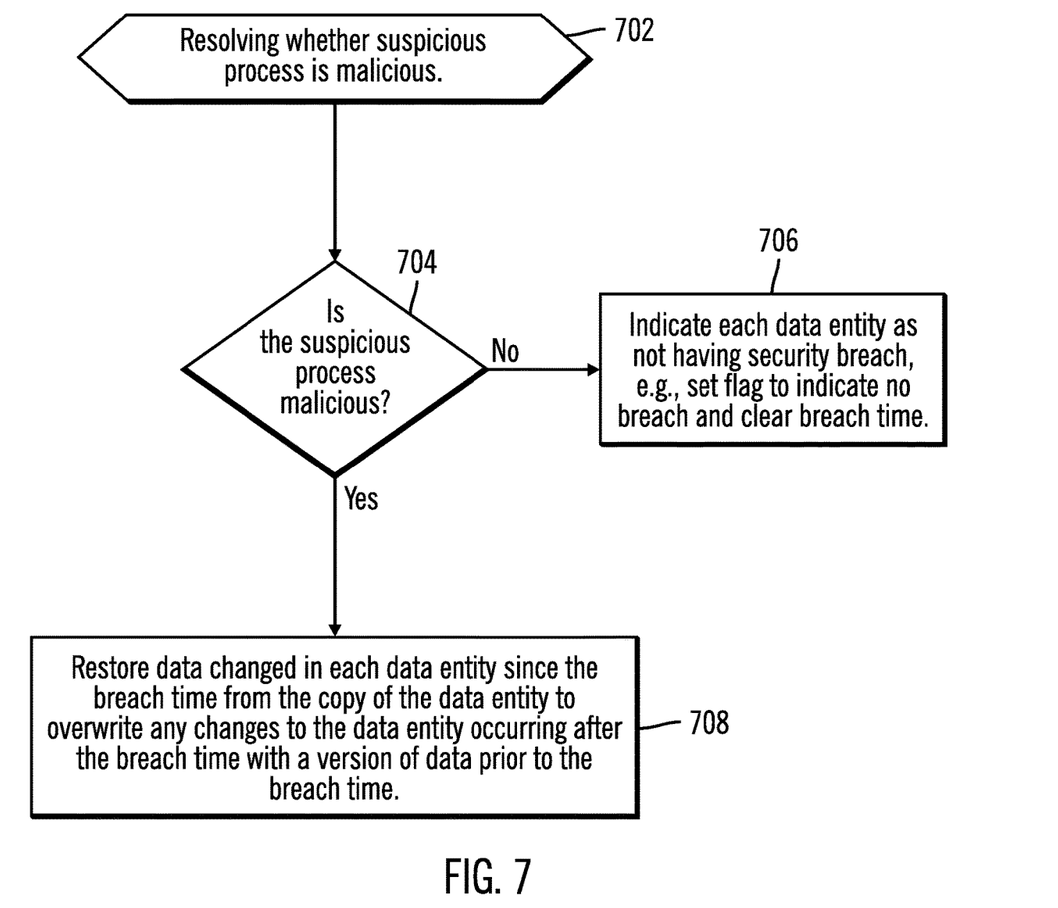
FIG. 7 illustrates an embodiment of operations to process resolving whether a suspicious process is malicious.

FIG. 7 illustrates an embodiment of operations performed by the threat manager 124 in response to resolving whether a suspicious process is malicious or non-malicious. Upon resolving (at block 702) the maliciousness of a suspicious process, if (at block 704) the suspicious process is not in fact malicious, then each of the data entities 108 is indicated (at block 706) as not having been breached, such as by setting breach flag 204 to indicate no breach and clearing the breach time 206 field in the data entity security information $200_i$ for each data entity $108_i$. If (at block 704) the suspicious process is malicious, then the threat manager 124 restores (at block 708), for each data entity $108_i$, data changed in each data entity $108_i$ since the breach time 206 from the copy of the data entity $130_i$, which includes the version of data prior to the breach time 208.

In described embodiments, each data entity 108 in the storage 110, such as a volume, data set, logical drive or other grouping of data, may be separately monitored for threats, such that when a threat is detected with respect to a particular data entity $108_i$, then a breach 204 and breach time 206 for the data entity are recorded in the data entity security information $200_i$ for the data entity $108_i$. This allows the return of read data from a data entity that is ensured to not have been altered by a suspicious process, by returning data that has not been changed since the breach time with respect to the data entity $108_i$. Further, writes are allowed to proceed against each data entity by maintaining for each data entity subject to a security breach a copy of the data entity, such as a point-in-time copy 130, that may be used to restore data if the suspicious process is later confirmed to be malicious.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
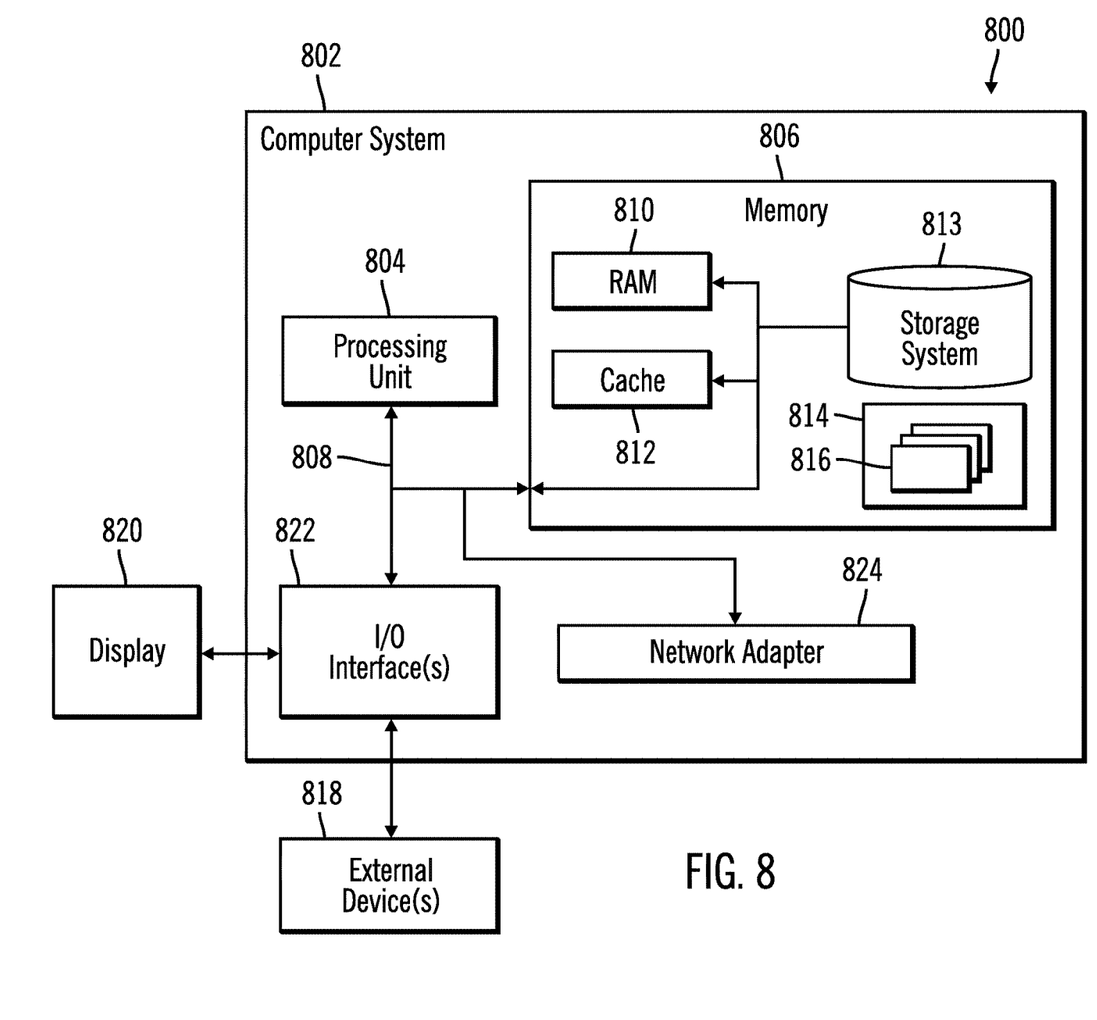
FIG. 8 illustrates a computing environment in which the components of FIG. 1 may be implemented

The computational components of FIG. 1, including the hosts $102_1, 102_2 \ldots 102_n$ and storage controller 104, may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for handling a security breach to a system managing access to a storage, the computer program product comprising a computer readable storage medium having computer readable program code embodied therein that when executed performs operations, the operations comprising:

detecting a suspicious process determined to have malicious code;

indicating a breach time for a data entity by storing an indication of the breach time and indicating the data entity as subject to a security breach in data entity information in a memory associated with the data entity in response to detecting the suspicious process performing an operation with respect to the data entity, wherein the breach time is a time that performing of the operation on the data entity was detected;

determining whether a write request from the suspicious process is directed to the data entity;

determining whether there is a copy of the data entity created after the breach time for the data entity in response to determining that the write request is directed to the data entity having the security breach;

creating a copy of the data entity in response to determining that there is no copy of the data entity created after the breach time when receiving the write request to the data entity; and writing write data of the write request to the data entity after creating the copy of the data entity in response to determining that there is no copy of the data entity created after the breach time.

2. The computer program product of claim 1, wherein indication is made of a security breach for each of a plurality of data entities and a breach time for the data entity when detecting a suspicious process performing an operation with respect to the data entity, and wherein, for each of the data entities, a copy of the data entity is created when there is no copy of the data entity when a write request is received from the suspicious process to the data entity.

3. The computer program product of claim 1, wherein the operations further comprise:

determining whether the write request is from the suspicious process, wherein the determining whether the write request is directed to the data entity indicated as having the security breach and whether the copy of the data entity was created after the breach time is performed in response to determining that the write request is from the suspicious process; and allowing the write request to proceed in response to determining that the write request is not from the suspicious process.

4. The computer program product of claim 1, wherein the operations further comprise:

determining whether a read request for requested data is directed to a target data entity indicated as having a security breach;

determining whether the requested data in the target data entity has a timestamp earlier than the breach time;

allowing the read request to proceed in response to determining that the timestamp of the requested data is earlier than the breach time; and blocking the read request in response to determining that the timestamp of the requested data is later than the breach time.

5. The computer program product of claim 4, wherein the operations further comprise:

determining whether the requested data is indicated as sensitive data;

allowing the read request to proceed in response to determining that the requested data is not indicated as sensitive; and blocking the read request in response to determining that the requested data is indicated as sensitive.

6. The computer program product of claim 5, wherein the operations further comprise:

determining whether the read request is from the suspicious process that has been detected to have malicious code, wherein the operations of determining whether the requested data is indicated as sensitive, allowing the read request to proceed, and blocking the read request are performed in response to determining that the suspicious process is detected to have malicious code; and allowing the read request to proceed in response to determining that the read request is not from the suspicious process.

7. The computer program product of claim 1, wherein the copy of the data entity comprises a point-in-time copy of the data entity, wherein point-in-time data in the data entity as of a time the data entity was created is saved before updating the point-in-time data.

8. The computer program product of claim 1, wherein the detected suspicious process comprises a process determined to likely have malicious code, wherein the operations further comprise:
   determining that the suspicious process is verified as having malicious code; and
   restoring data changed in the data entity since the breach time from the copy of the data entity to overwrite any changes to the data entity occurring after the breach time with a version of data prior to the breach time in response to verifying that the suspicious process has malicious code.

9. A system for handling a security breach to a system managing access to a storage, comprising:
   a processor; and
   a computer readable storage medium having computer readable program code that when executed by the processor performs operations, the operations comprising:
      detecting a suspicious process determined to have malicious code;
      indicating a breach time for a data entity by storing an indication of the breach time and indicating the data entity as subject to a security breach in data entity information in a memory associated with the data entity in response to detecting the suspicious process performing an operation with respect to the data entity wherein the breach time is a time that performing of the operation on the data entity was detected;
      determining whether a write request from the suspicious process is directed to the data entity;
      determining whether there is a copy of the data entity created after the breach time for the data entity in response to determining that the write request is directed to the data entity having the security breach;
      creating a copy of the data entity in response to determining that there is no copy of the data entity created after the breach time when receiving the write request to the data entity; and
      writing write data of the write request to the data entity after creating the copy of the data entity in response to determining that there is no copy of the data entity created after the breach time.

10. The system of claim 9, wherein indication is made of a security breach for each of a plurality of data entities and a breach time for the data entity when detecting a suspicious process performing an operation with respect to the data entity, and wherein, for each of the data entities, a copy of the data entity is created when there is no copy of the data entity when a write request is received from the suspicious process to the data entity.

11. The system of claim 9, wherein the operations further comprise:
   determining whether the write request is from the suspicious process, wherein the determining whether the write request is directed to the data entity indicated as having the security breach and whether the copy of the data entity was created after the breach time is performed in response to determining that the write request is from the suspicious process; and
   allowing the write request to proceed in response to determining that the write request is not from the suspicious process.

12. The system of claim 9, wherein the operations further comprise:
   determining whether a read request for requested data is directed to a target data entity indicated as having a security breach;
   determining whether the requested data in the target data entity has a timestamp earlier than the breach time;
   allowing the read request to proceed in response to determining that the timestamp of the requested data is earlier than the breach time; and
   blocking the read request in response to determining that the timestamp of the requested data is later than the breach time.

13. The system of claim 12, wherein the operations further comprise:
   determining whether the requested data is indicated as sensitive data;
   allowing the read request to proceed in response to determining that the requested data is not indicated as sensitive; and
   blocking the read request in response to determining that the requested data is indicated as sensitive.

14. The system of claim 9, wherein the detected suspicious process comprises a process determined to likely have malicious code, wherein the operations further comprise:
   determining that the suspicious process is verified as having malicious code; and
   restoring data changed in the data entity since the breach time from the copy of the data entity to overwrite any changes to the data entity occurring after the breach time with a version of data prior to the breach time in response to verifying that the suspicious process has malicious code.

15. A method for handling a security breach to a system managing access to a storage, comprising:
   detecting a suspicious process determined to have malicious code;
   indicating a breach time for a data entity by storing an indication of the breach time and indicating the data entity as subject to a security breach in data entity information in a memory associated with the data entity in response to detecting the suspicious process performing an operation with respect to the data entity wherein the breach time is a time that performing of the operation on the data entity was detected;
   determining whether a write request from the suspicious process is directed to the data entity;
   determining whether there is a copy of the data entity created after the breach time for the data entity in response to determining that the write request is directed to the data entity having the security breach;
   creating a copy of the data entity in response to determining that there is no copy of the data entity created after the breach time when receiving the write request to the data entity; and
   writing write data of the write request to the data entity after creating the copy of the data entity in response to determining that there is no copy of the data entity created after the breach time.

16. The method of claim 15, wherein indication is made of a security breach for each of a plurality of data entities and a breach time for the data entity when detecting a suspicious process performing an operation with respect to the data entity, and wherein, for each of the data entities, a copy of the data entity is created when there is no copy of the data entity when a write request is received from the suspicious process to the data entity.

17. The method of claim 15, further comprising:
  determining whether the write request is from the suspicious process, wherein the determining whether the write request is directed to the data entity indicated as having the security breach and whether the copy of the data entity was created after the breach time is performed in response to determining that the write request is from the suspicious process; and
  allowing the write request to proceed in response to determining that the write request is not from the suspicious process.

18. The method of claim 15, further comprising:
  determining whether a read request for requested data is directed to a target data entity indicated as having a security breach;
  determining whether the requested data in the target data entity has a timestamp earlier than the breach time;
  allowing the read request to proceed in response to determining that the timestamp of the requested data is earlier than the breach time; and
  blocking the read request in response to determining that the timestamp of the requested data is later than the breach time.

19. The method of claim 18, further comprising:
  determining whether the requested data is indicated as sensitive data;
  allowing the read request to proceed in response to determining that the requested data is not indicated as sensitive; and
  blocking the read request in response to determining that the requested data is indicated as sensitive.

* * * * *